United States Patent [19]

Irrgeher

[11] Patent Number: 4,801,016
[45] Date of Patent: Jan. 31, 1989

[54] PLANAR ELEMENT STORAGE AND DISPLAY APPARATUS

[75] Inventor: Hans Irrgeher, Linz, Austria

[73] Assignee: Elmer L. Thompson, Jr., Knoxville, Tenn.

[21] Appl. No.: 195,480

[22] Filed: May 6, 1988

Related U.S. Application Data

[63] Continuation of Ser. No. 934,737, Nov. 25, 1986, abandoned.

[30] Foreign Application Priority Data

Oct. 15, 1986 [AT] Austria .................................. 2739/86

[51] Int. Cl.4 ...................... B65D 85/16; G09F 11/30
[52] U.S. Cl. ..................................... 206/455; 40/490; 40/511; 40/513
[58] Field of Search .................... 40/490, 511, 513; 206/45.31, 45.34, 425, 455, 556

[56] References Cited

U.S. PATENT DOCUMENTS

| | | | |
|---|---|---|---|
| 3,377,727 | 4/1968 | Weggeland | 40/511 |
| 4,238,898 | 12/1980 | Ackeret | 40/513 |
| 4,241,528 | 12/1980 | Ackeret | 40/511 X |
| 4,259,802 | 4/1981 | Ackeret | 40/511 X |
| 4,376,348 | 3/1983 | Ackeret | 40/511 X |

Primary Examiner—Jimmy G. Foster
Attorney, Agent, or Firm—Norton & Luhn

[57] ABSTRACT

A planar element storage and display apparatus is provided having an outer box and a carriage slidably mounted therein. The carriage can be pulled from the outer box and a stack of planar elements such as photographs can be placed face up therein. The carriage box is provided with a display window for viewing the upper most element when the carriage carrying the stack of photographs is pushed into the outer box. The outer box is equipped with a detaching means which holds the upper most element and separates it from the stack when the carriage is withdrawn from the outer box. When the carriage is pulled out of the outer box, the upper most element is separated from the stack and drops to the floor of the outer box. Means is provided for placing the dropped element on the bottom of the stack when the carriage is pushed back into the outer box.

7 Claims, 4 Drawing Sheets

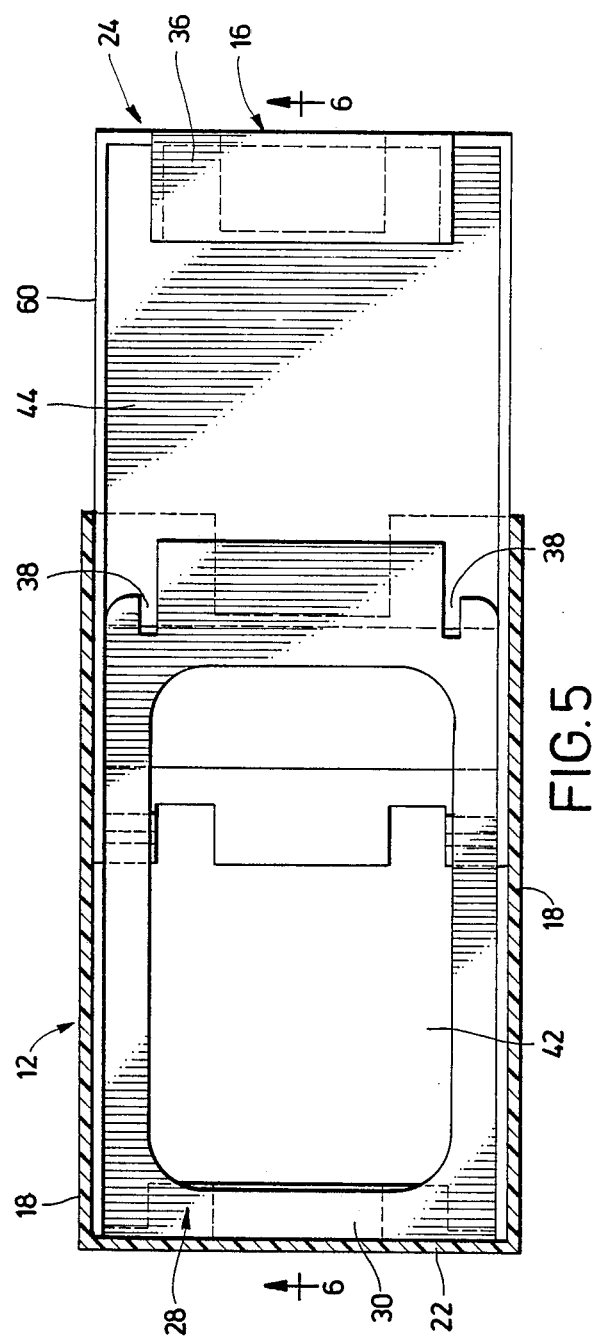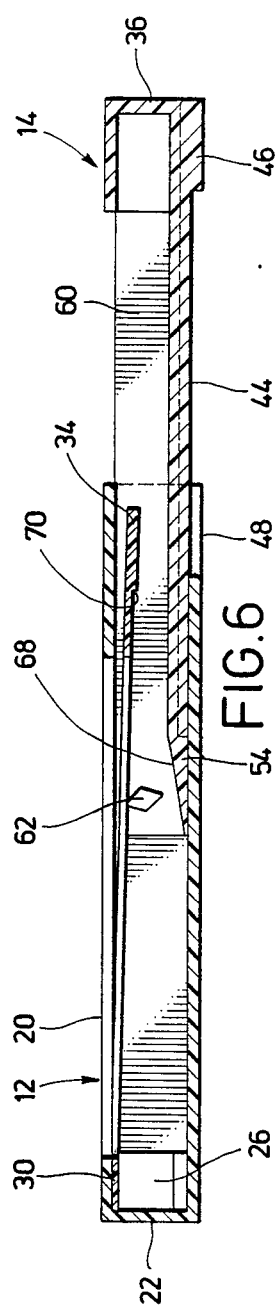

PLANAR ELEMENT STORAGE AND DISPLAY APPARATUS

This application is a continuation of application Ser. No. 934,737 filed Nov. 25, 1986, now abandoned.

FIELD OF INVENTION

The present invention relates to an apparatus for storing and displaying planar elements such as photographs. In particular, this invention relates to a planar element viewing device having a carriage slidably mounted inside an outer box. Said carriage is equipped to carry a stack of planar elements, such as photographs, such that when the carriage is pushed into the outer box, the upper most photograph is displayed through a display window. When the carriage is withdrawn from the box, a detaching means holds the upper most planar element separating it from stack and allowing it to fall to the floor of the box. When the carriage is pushed back into place within the box, means is provided to restack the fallen element with the stack, thus keeping the stack in a predetermined order.

BACKGROUND AND SUMMARY OF INVENTION

Various types of planar element viewers are known. They may be simple enclosures for use with photographic prints or they may be picture frames used in combination with slide projectors. Various types of slide cassettes allow a stack of pictures to be viewed in succession without having to handle them. The order of the pictures in the cassette having been once arranged can be maintained through various viewings.

Many of the conventional viewers available are expensive and very complicated in their construction because of the many moving parts and the extensive use of various mechanical parts and springs. Many times a negative result occurs through mishandling when planar elements such as photographs and slides are not kept in order or are damaged. It is therefore an object of this invention, among others, to provide a display apparatus which is simple to manufacture, has a high operating reliability and which protects the elements from scratches, abrasions and other damage.

The present invention solves the problem of damage to the face of the planar elements by providing a detaching means at the side of the stack of pictures next to the display window. The detaching means comprises a stop protruding near the open end of the outer box transverse to the direction that the carriage is withdrawn from the outer box and having a thickness not more than the thickness of a planar element. The carriage is provided with a pair of edge walls or guide walls which hold the sides of a stack of elements, and which is further provided with a rigid receiver which carries the bottom of the stack of pictures over a bearing surface located on the bottom of the box opposite the viewing window. When the carriage is pushed into the outer box, the element nearest the window and which has been detached from the stack, is deposited on the bottom element bearing surface and is supported by the bearing surface at its rear transverse edge. The receiver then accepts the detached element and transports it to the bottom of the stack in the carriage.

One object of the invention is to avoid the use of springs to remove the upper most element from the stack. In its normal operational mode, with the display window facing upward and the upper most picture visible, the detached elements will fall to the bottom of the box and thus are in a position to realign themselves to the bottom of the stack. Another consideration of this invention is that if the elements are photographic prints they have a tendency to assume a transverse curature, convex to the side of the picture, and/or can be slightly deformed in the same way by simply squeezing the stack of pictures from the direction of the long individual edges before placing them in the carriage. Due to the existing or imposed transverse curvature, the longitudinal stress of the elements is increased and the longitudinal curvature is eliminated. When the upper most element is detached, there is a natural tendency of the element to return to its natural state of flex which assures that the picture will be released from the carriage. Since the photographs have a tendency to arch, the number of elements in the stack is not critical. In other words, a carriage designed for a predetermined number of elements can accept a few more elements or a few less elements, because the height of the stack adjusts itself automatically to the desired height by causing an increase or decrease in the curvature of the individual elements which insures that the top element will engage the detaching means. If too few pictures are inserted, one can turn the box over so that the window faces downward, and pull the carriage out. With the carriage still withdrawn, turn the box over so that the window is facing upward. This causes the detached element to fall downward and when the carriage is pushed in, the fallen element is restacked on the bottom of the stack. Finally, the tendency of the pictures to assume a slight curvature facilitates the engagement of the pictures with the said receiver. This overall design results in a planar element storage and display apparatus which is easily constructed and has a high reliability during operation, especially in the operation of the detaching means and the restacking means.

In accordance with the preferred embodiment, the detaching means shows a clamping device, which is frame shaped and is located near the display window side of the box. Said clamp is canterlevered at at one end and attached opposite the open end of the box just under the top of the box near the window. The clamping device has a window aperture and/or a transparent window piece.

The clamping device holds the upper most element a distance from the inside top of the box and the box window. The clamping device may be decorated and serve as a decorative frame for the top element. The primary function of the clamping device, however, consists of providing a balance between varying numbers of elements in the stack and/or the different resilient properties of the elements and to ensure that even with minor differences in the height of the stack the top element will be engaged by the detaching means.

In order to stabilize the clamping device when the carriage is pushed in, at the drawing end of the carriage, a handle is provided, which has a recessed slot for receiving and holding the free end of the clamping device when the carriage is totally pushed into the box.

In order for the detached element to engage a receiver at the bottom of the carriage, only the side edges of the element may be supported. To accomplish this while utilizing the transverse curve of the element, the preferred embodiment has a tongue-like projection at the leading edge of the floor of the carriage. Said projection has a wedge-shaped surface that rises toward the bearing surface of the floor of the carriage which carries the stack of elements. Guide pieces, projecting from the side walls of the tray, near the feed end are assigned to said projection, and define the limit of the transverse sides of the stack of elements.

The feed slots for the side edges of the detached elements are left open between the bottom of the element and the floor of either the box or the carriage. The wedge surface extends under the front edge of the bottom of the stack thus facilitating the restacking of the detached element with the stack.

Each individual element in the stack can have a different transverse curvature. It is recommended that each detached element be placed at the bottom of the stack with as little transverse curvature as possible. To align the detached element, the tongue-like projection and the guide piece interact together. To flatten even severely curved elements and restack them with certainty at the bottom of the stack, the bottom side of each guide piece can be slanted perpendicularly to the direction of the wedged surface of the tongue-like projection at the edge of the floor of the carriage, the two of said surfaces forming a funnel-like inlet at each guide piece which inlet has at its narrowest point the approximate thickness of one element.

In order for the element to move freely from its arched condition to a flattened condition, the tongue-like projection can have a wide middle piece and the edge pieces can have slots so that the element is supported by the receiver only in the middle and at its edges. Thus as the element is moved through the inlets, it is flattened by the guide pieces.

The guide pieces can serve a dual function. Each guide piece has an upper guide surface which together with the clamping device form edge guides for the withdrawn element while limiting the downward movement of the clamping device.

Finally, in order to have a smooth operation at the end opposite the open end of the box, a stop for the rear edge of the withdrawn picture is provided with recesses therein to receive the tongue-like projection of the receiver and the guide pieces.

Other objects and many of the attendant advantages of the invention will become readily apparent from the description when taken in conjunction with the accompanying drawings.

BRIEF DESCRIPTION OF THE DRAWINGS

The present invention may best be understood by reference to a detailed description of a preferred embodiment when considered in conjunction with the drawings in which:

FIG. 5 is the invention as shown in FIG. 2, with the slide partially withdrawn from the outer box:

FIG. 6 is a section view along line VI—VI of FIG. 5;

DETAILED DESCRIPTION

Figure 1:
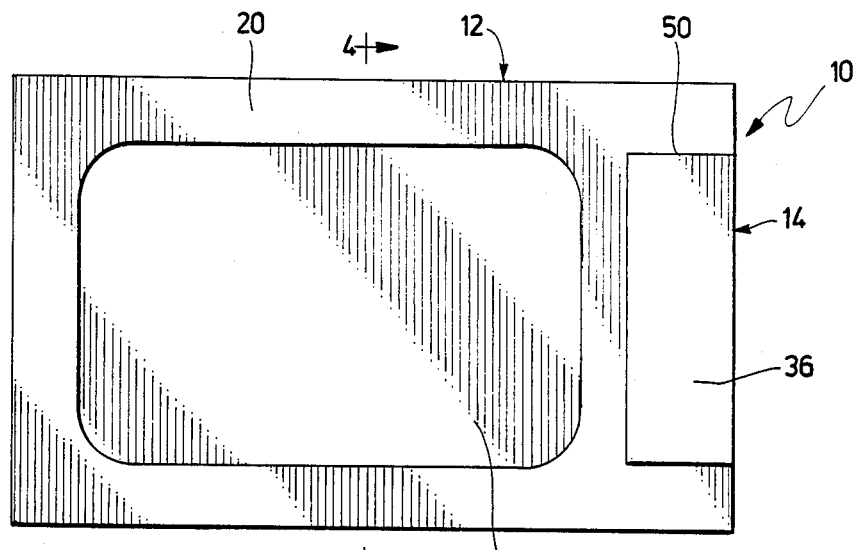
FIG. 1 is a top plan view incorporating one form of the present invention.
Figure 2:
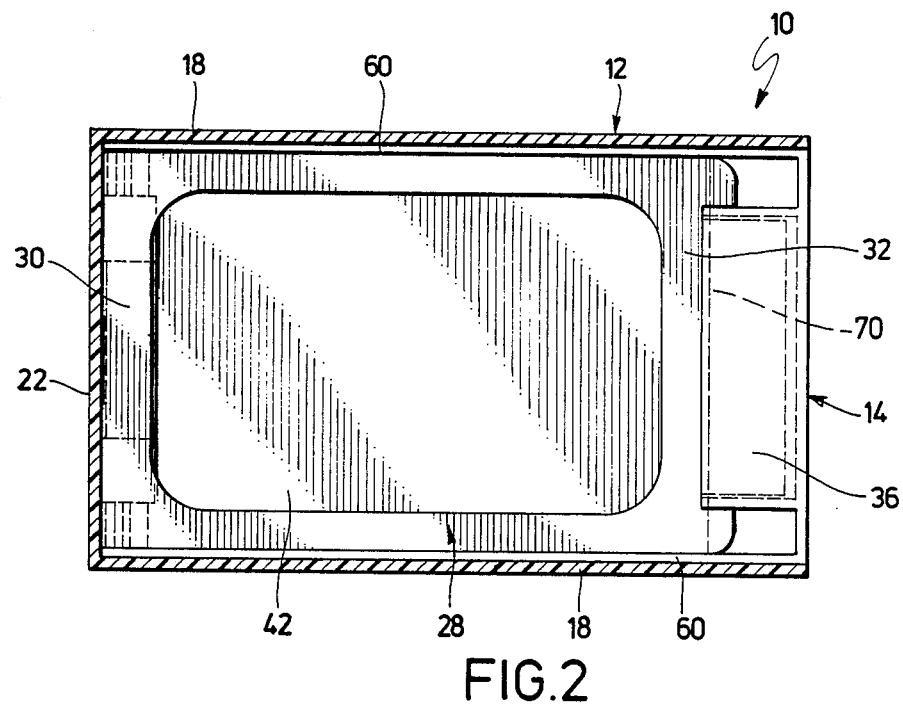
FIG. 2 is a top plan view as shown in FIG. 1 with the top of the outer box removed.
Figure 3:
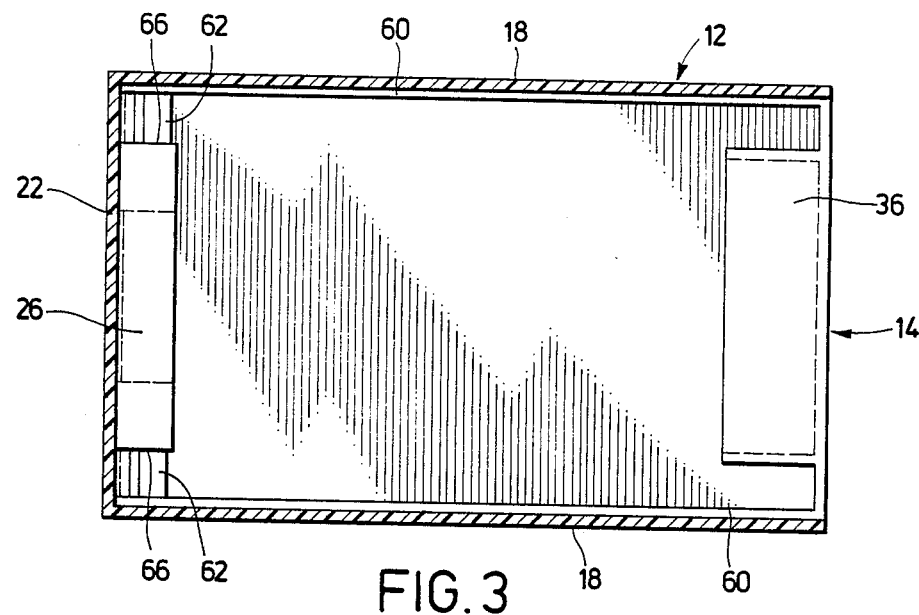
FIG. 3 shows a cut away parallel to the floor of the invention and below the clamping device.
Figure 4:
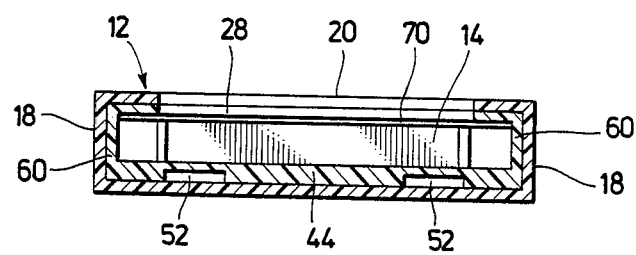
FIG. 4 is a cross section along line IV—IV of FIG. 1.
Figure 7:
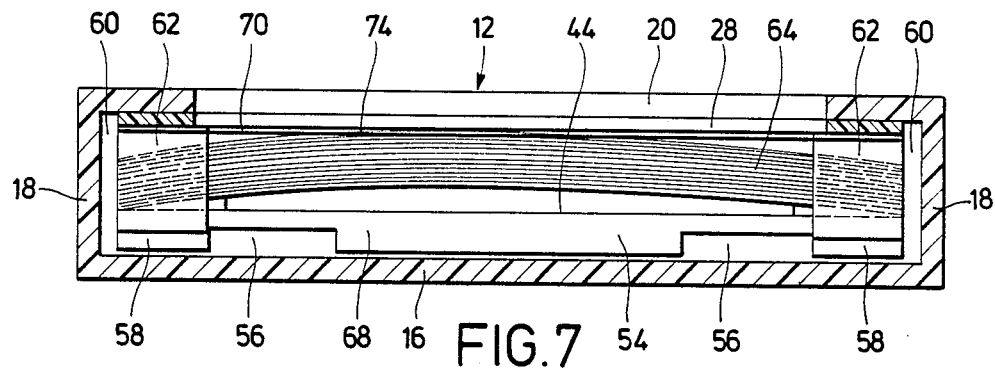
FIG. 7 is an enlarged cross section with the tray partially withdrawn and showing a stack of photographs nested in the tray.

Referring now to the drawings in which like reference characters designate like or corresponding parts through out the several views, FIG. 1 shows a top plan view of the planar element storage and display apparatus 10 having an outer box 12 and a carriage 14 which is guided the length of the said box and can be withdrawn. Both parts are made of a substantially rigid material such as molded plastic. The outer box has a floor 16, side walls 18, a cover 20, made of a transparent material, and a terminating wall 22, which is opposite the drawing end 24 of carriage 14. A projection 26 is molded to said terminating wall 22. Below cover 20 is a frame-shaped clamp 28, which in the preferred embodiment has the shape of a rectangular frame. Longitudinal end 30 is cantelvered at projection 26 and the free end 32 is attached such as to apply a downward pressure. Free end 32 of clamp 28 has a projection 34 which when carriage 14 is pushed into the outer box, a recess in handle 36 engages said projection 34. There are provided slots 38 on either side of projection 34 into which the side walls of handle 36 engage.

FIG. 1 shows an embodiment in which the cover 20 of the outer box 12 is formed by a frame-shaped, non-transparent outer piece and an inserted, transparent window piece 40 in which the aperture 42 of the frame of the frame clamp 28 corresponds to the said window piece 40. The floor 16 of the outer box 12 is flat.

The carriage 14 is, as shown earlier, provided with handle 36. The carriage floor 44 is offset from handle 36, such that bottom piece 46 of the handle is formed to engage with recess 48 of floor 16 of box 12 and the top piece of handle 36 is intended to engage with a corresponding recess 50 in cover 20 of box 12. Parallel longitudinal groves 52 may be molded into floor 44. The leading edge of floor 44 which points into the box has a projection 54 which engages a recess below projection 26 when the carriage is pushed totally into box 12. This projection has slots 56 located between a wide intermediate tongue piece 54 and the edge pieces 58. Carriage 14 is provided with side walls 60 which extend the length of said carriage, and which extend up to wall 22 when the carriage is pushed inside box 12, and which walls carry inwardly mounted guide pieces 62. Guide pieces 62 are rhomboidal in cross-section and are positioned such that the top edge of each guide piece form a wedge-shaped gap with clamp 28, with the said gap open toward the open end of the box, and a second wedge-shaped gap is formed between pieces 62 and edge pieces 58, with the open end of said second gap being toward the closed end of box 12. The side, pointing toward the handle 36 of guide pieces 62 form the boundary for the transverse side of a stack of planar elements 64 which are received into carriage 14. The side walls 60 act as side guides for stack 64, and the face of handle 36 acts as a boundary for the transverse side of stack 64. When carriage 14 is pushed totally into box 12, guide pieces 62 are received into slots 66 located on either side of projection 26. A wedge surface 68 of tongue 54 engages a recess below projection 26.

There is provided a strip-like detaching stop 70, on the bottom of clamp 28 near projection 34, which stop is at most the thickness of a single photograph or planar element.

To use the invention, a stack 64 of planar elements such as photographs 64 is placed into the receiving space of carriage 14, and the carriage is moved into the position shown in FIGS. 1, 2, 3, 4 or 7. The top element 74 of the stack (FIG. 7) is visible through aperture 42 and window piece 40. Guide pieces 62 are in their recessed resting positions on each side of projection 26. In the closed position, the stack 64 is pressed against projection 26 and perpendicular to the guide surfaces of pieces 62. Due to the size of the housing and/or the natural deformation of the elements, the elements assume a slight transverse curvature. The clamp 28 presses slightly on the top element 74.

Figure 8:
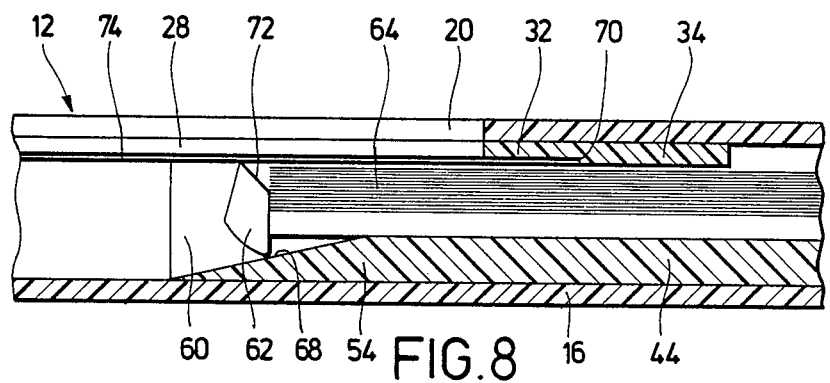
FIG. 8 is a partial longitudinal cross section showing the upper most photograph being separated from the stack.
Figure 9:
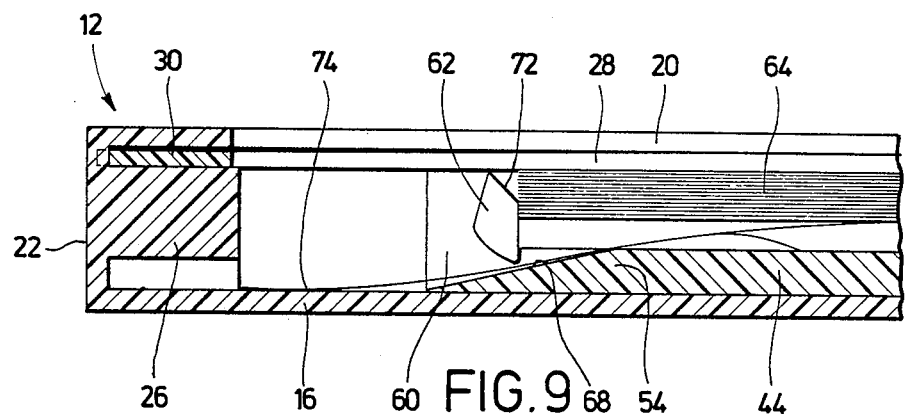
FIG. 9 is a partial longitudinal cross section showing the upper most picture which has fallen to the floor of the box being rejoined with the bottom of the stack.

When the carriage 14 is pulled out of the outer box 12, the top element 74 (FIG. 8) comes in contact with the strip-like detaching stop 70. As the carriage is further withdrawn from the outer box, the top picture is detached from stack 64, whereby its side edges, starting from the rear edge area, are pressed upward over the upper slanted guide surfaces 72 of guide pieces 62. In this manner the withdrawn picture 74 is held flat. Moreover, operating errors and damage to the picture is prevented because if carriage 14 is not withdrawn from the outer box a sufficient distance, then the top picture 74 remains in its relative position on the top of stack 64. If carriage 14 is pushed back into the outer box 12, the top element 74 can be returned upward over the stack while bearing on the inside of projection 26. If carriage 14 is pulled out from box 14 a sufficient distance, so that guide pieces 62 move past the vertex of upper guide surface 72 over the detaching stop 70, then top element 74 is completely free and falls to floor 16 of box 12. The vertex areas of guide pieces 62 remain engaged with side pieces of clamp 28. After element 74 has dropped to floor 16, carriage 14 is pushed back into box 12. During this operation, tongue 54 and edge pieces 58 engage with their corresponding upper wedge surfaces 68 with the top element 74, as shown in FIG. 9, and push said element against projection 26. The edge pieces 58 engage with their corresponding upper wedge surfaces 68 with the top element against projection 26. The edge of element 74 which faces carriage 14 is lifted and slid through the narrowest point of the wedge gap via the bottom side of guide pieces 62. Thus by means of the interaction among pieces 54,56 and 62 the picture is flattened from its natural or forced transverse curve and slides under the stack 64 of pictures, because the wedge surface 68 extends up under the bearing surface of the stack 64. When carriage 14 is further pushed into box 12, picture 74 is pushed under the stack 64 of pictures such that when carriage 14 is completely pushed inside box 12, top element 74 is at the bottom of stack 64 and a new top element on stack 64 may be viewed through window 40.

Although a particular embodiment has been described in the foregoing detailed description, it will be understood that the invention is capable of numerous rearrangements, modifications and substitutions of parts without departing from the scope of the invention.

What is claimed is:

1. An apparatus for storing a stack of planar elements having a slight transverse curvature and displaying at least one of the planar elements, comprising:

an outer box having a display window;

a carriage slidably mounted within said box for transporting the stack of planar elements between at least extended and retracted positions; said carriage comprising:

a carriage floor having two sides and two ends and being dimensioned from end to end so that the planar elements extend beyond said carriage floor;

a pair of parallel side walls attached to the sides of said carriage floor dimensioned to engage opposite edges of the planar elements to maintain their slight transverse curvature;

a tongue disposed adjacent to and extending from one end of said carriage floor and at least a portion of said tongue being disposed below and spaced apart from the stack of planar elements;

a pair of opposed guide pieces attached to said parallel side walls and above said tongue for retaining the stack of planar elements within the carriage except for the top planar element as the carriage moves from the retracted position to the extended position and for guiding a planar element disposed in the outer box below the guide pieces and the stack as the carriage moves from the extended position to the retracted position; and an end wall formed on the end of said floor opposite said tongue so that a boundary is formed for the transverse edge of the stack of elements;

a frame having opposed first and second ends being attached at one end to said box opposite a carriage admitting end of said box and having the second end of said frame free to move downwardly to the stack of planar elements;

a stop attached to said second end of said frame, dimensioned with a thickness such that it engages only a single element, having a leading edge for engaging and stripping the top element from the stack as the carriage is moved from the retracted position to the extended position and transporting the top planar element in said box, and having a trailing edge disposed for resting on the stack when said carriage is in the extended position; and an engagement surface disposed within said box for engaging a planar element within said box and pushing it under the stack when said carriage is moved from the extended position to the retract position.

2. The apparatus of claim 1 wherein the frame has a window aperture formed there and aligned with the display window in the outer box whereby the upper most element may be viewed when said carriage is in the retracted position.

3. The apparatus of claim 1 wherein a handle is attached to said carriage and a recess is formed in the outer box whereby said handle is received into said recess when said carriage is fully retracted.

4. The apparatus of claim 1 wherein said outer box has a floor opposite said display window and a pair of parallel longitudinal groves extending perpendicular to the open end of said outer box.

5. The apparatus of claim 1 wherein said guide pieces have rhomboidal shaped cross-sections.

6. The apparatus of claim 1 wherein said tongue disposed adjacent to the carriage floor is wedge-shaped.

7. An apparatus for storing a stack of planar elements having a slight transverse curvature and displaying at least one of the planar elements, comprising:

an outer box having a display window;

a carriage slidably mounted within said box for transporting the stack of planar elements between at least extended and retracted positions; said carriage comprising;

a carriage floor having two sides and two ends and being dimensioned from end to end so that the planar elements extend beyond said carriage floor;

a pair of parallel side walls attached to the sides of said carriage floor dimensioned to engage opposite edges of the planar elements to maintain their slight transverse curvature;

a wedge-shaped tongue disposed adjacent to and extending from one end of said carriage floor and at least a portion of said tongue being disposed below and spaced apart from the stack of planar elements;

a pair of opposed rhomboidal-shaped guide pieces attached to said parallel side walls and above said wedge-shaped tongue for retaining the stack of planar elements within the carriage except for the top planar element as the carriage moves from the retracted position to the extended position and for guiding a planar element disposed in the outer box below the guide pieces and the stack as the carriage moves from the extended position to the retracted position;

an end wall formed on the end of said floor opposite said tongue so that a boundary is formed for the transverse edge of the stack of elements; and a handle having a recepticle attached to said carriage floor opposite said tongue;

a frame having opposed first and second ends, being attached at one end to said box opposite a carriage admitting end of said box and having the second end of said frame free to move downwardly to the stack of planar elements;

a stop attached to said second end of said frame, dimensioned with a thickness such that it engages only a single element, having a leading edge for engaging and stripping the top element from the stack as the carriage is moved from the retracted position to the extended position and transporting the top planar element in said box, and having a trailing edge disposed for resting on the stack when said carriage is in the extended position; and an engagement surface disposed within said box for engaging a planar element within said box and pushing it under the stack when said carriage is moved from the extended position to the retracted position and which surface engages said handle recepticle when said carriage is moved to the retracted position.

* * * * *